United States Patent
Guzman-Casillas et al.

[11] Patent Number: 6,028,754
[45] Date of Patent: Feb. 22, 2000

[54] SYSTEM FOR PREVENTING UNDESIRED PROTECTIVE RELAY TRIPPING ACTIONS DUE TO COUPLING CAPACITOR VOLTAGE TRANSFORMER TRANSIENTS

[75] Inventors: Armando Guzman-Casillas; Jeffrey B. Roberts, both of Pullman, Wash.

[73] Assignee: Schweitzer Engineering Laboratories, Inc., Pullman, Wash.

[21] Appl. No.: 08/953,310

[22] Filed: Oct. 17, 1997

Related U.S. Application Data

[63] Continuation-in-part of application No. 08/546,226, Oct. 20, 1995, Pat. No. 5,703,745.

[51] Int. Cl.$^7$ ........................................................ H02H 3/00
[52] U.S. Cl. ............................ 361/89; 361/80; 361/65; 361/115
[58] Field of Search ........................ 361/89, 115, 80, 361/93, 94, 65

[56] References Cited

U.S. PATENT DOCUMENTS

| | | | |
|---|---|---|---|
| 4,821,137 | 4/1989 | Wilkinson | 361/80 |
| 5,349,490 | 9/1994 | Roberts | 361/80 |
| 5,703,745 | 12/1997 | Roberts et al. | 361/89 |

OTHER PUBLICATIONS

Electric Machinery, A. E. Fitzgerald et al., 4th Ed., 1983 McGraw–Hill, pp. 499–500, 528–530 1983.

*Primary Examiner*—Stephen W Jackson
*Attorney, Agent, or Firm*—Jensen & Puntigam, P.S.

[57] ABSTRACT

The system impedance ratio (SIR) is determined for the original zone 1 distance element reach of a protective relay. The reduction in the original zone 1 reach is then determined, using the SIR value and a known table of reduced values. When a fault is recognized the minimum reach to just detect the fault is determined. A trip signal is provided without any delay if the minimum reach is less than or equal to the reduced reach. The trip is delayed for a selected time if the minimum reach is greater than the reduced reach but not greater than the original reach.

5 Claims, 5 Drawing Sheets

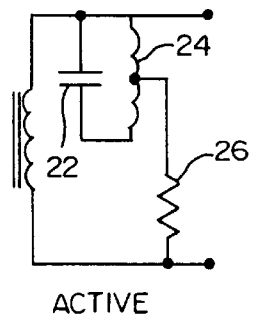
FIG. 4A
ACTIVE
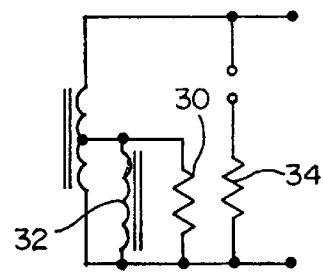
PASSIVE
FIG. 4B
FIG. 5
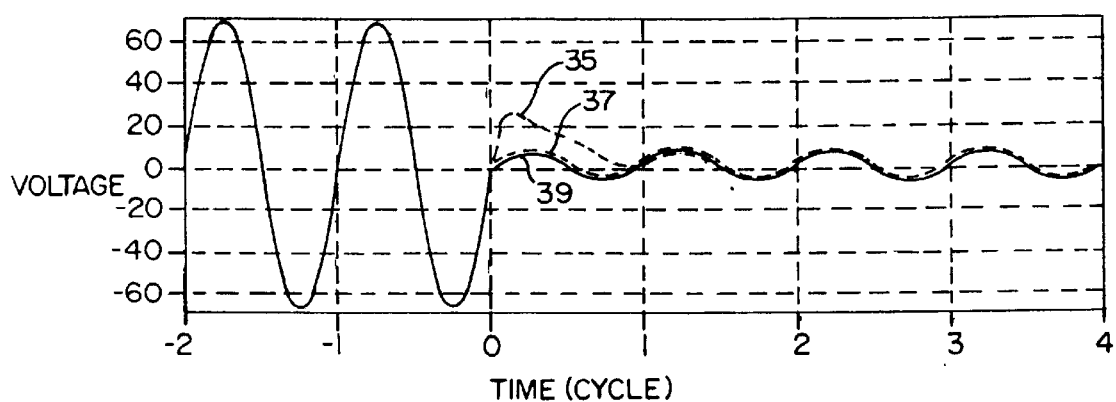

6,028,754

SYSTEM FOR PREVENTING UNDESIRED PROTECTIVE RELAY TRIPPING ACTIONS DUE TO COUPLING CAPACITOR VOLTAGE TRANSFORMER TRANSIENTS

This is a continuation-in-part of application Ser. No. 08/546,226 filed on Oct. 20, 1995, now U.S. Pat. No. 5,703,745.

This invention concerns generally the use of capacitively coupled voltage transformers with protective relay systems for power transmission lines, and more specifically concerns logic circuitry for detecting a transient output from such capacitive voltage transformers.

BACKGROUND OF THE INVENTION

The use of coupling capacitor voltage transformers (CCVT) with protective relays is well known in transmission line protection. They are used as part of the voltage step-down system to decrease the voltage from the level on the transmission line (approximately 132.8 kv) phase-phase to a 66.4 volt level which is used by the protective relay in its monitoring of voltage conditions on the line. Briefly, the capacitor portion of the CCVT accomplishes an initial step-down voltage function, typically to a range of 5 kv to 15 kv, while the transformer portion of the CCVT accomplishes the additional step-down function to 115 volts phase-phase or 66.4 volts phase-ground.

In the past, CCVTs have provided satisfactory results when used with conventional electromechanical relays. However, with the introduction and now relatively widespread use of high-speed, solid-state and numerical-based relays, the primary disadvantage of many CCVTs, i.e. a relatively poor transient response, is significantly accentuated. The poor transient response of a CCVT, in which the output of the CCVT (the secondary of the transformer portion thereof) does not follow the input voltage, is due to the energy storage elements (the capacitors and the inductor) in the CCVT, which require time to dissipate their stored energy.

When a fault occurs, the input voltage to the CCVT from the transmission line can drop dramatically to a relatively low voltage. The output of the CCVT, however, instead of replicating the ratioed input voltage (the ideal CCVT secondary output) accurately, produces a transient response (an output which does not exactly match the ideal secondary output). After a certain amount of time, the CCVT output again is coincident with the ratioed input voltage.

A high-speed protective relay, such as currently available solid-state relays, can actually respond to such transients. If the fault on the transmission line is outside of the defined zone 1 reach of the relay (the typical protective relay will have several zones of protection), the particular distance elements in the relay responsible for zone 1 protection can overreach in response to the transient and produce an undesirable output. One response to the overreach problem is to reduce the zone 1 reach, although the CCVT transient in some situations is sufficiently large or of sufficient duration that the reduction of zone 1 results in zone 1 protection being no longer effective. Because zone 1 elements are primary protection for the transmission line, it is very desirable to have as much of the transmission line protected by zone 1 elements as possible. Accordingly, it is undesirable to significantly reduce the zone 1 reach and thereby reduce that portion of the line protected by zone 1 elements.

The CCVT transient reduces the fundamental component of fault voltage, which in turn results in a reduction of the calculated fault impedance. Further, if the output of a CCVT is significantly distorted due to the presence of a transient, the distance relay is incapable of measuring the correct faulted line impedance during the time of transient distortion. The result of the CCVT transient is the overreaching by the distance elements, with the zone 1 element overreach having the most undesirable result, as these elements are usually instantaneous.

Hence, while a CCVT has certain advantages (low cost at high voltage installations) which make it useful with protective relays, its usefulness is diminished by the fast response of the new solid-state and microprocessor protective relays, to the point where any results achieved during the transient time are unreliable.

DISCLOSURE OF THE INVENTION

Accordingly, the present invention is a system for increasing security in a power system using a protective relay having a zone 1 distance element with a set (preestablished) reach, the relay being responsive to a signal output from a secondary of a coupling capacitor voltage transformer, the secondary signal having a transient, wherein the system comprises: means for determining an SIR value for the original zone 1 reach of the protective relay; means for determining a reduction in the zone 1 reach using said SIR value and a chart which correlates SIR values with reduced reach values; means, in response to a fault which occurs on a power line portion of the power system, for determining whether the fault is within the reduced zone 1 reach; means for providing a trip signal without a deliberate delay if the fault is determined to be within the reduced zone 1 reach; and means for delaying a trip signal by a selected amount of time if the fault is determined to be beyond the reduced zone 1 reach, but within the original zone 1 reach.

BRIEF DESCRIPTION OF THE DRAWINGS

FIG. 4a is a diagram showing one ferroresonance circuit portion of a CCVT.

FIG. 4b shows an alternative to the circuit of FIG. 4a.

FIG. 5 is a diagram showing the transients of two CCVTs having different ferroresonance suppression circuits.

BEST MODE FOR CARRYING OUT THE INVENTION

Figure 1:
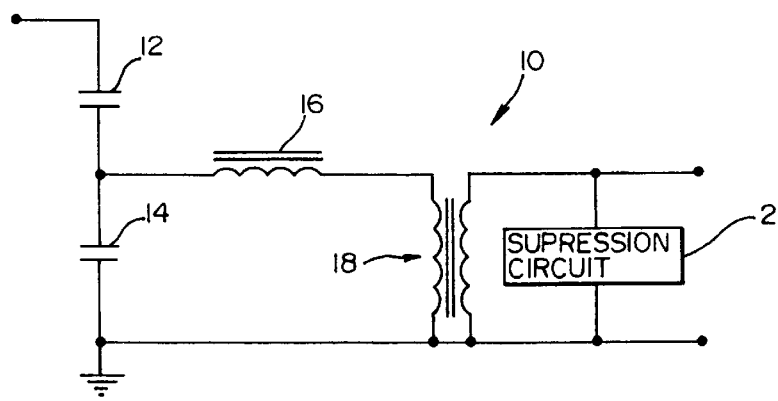
FIG. 1 is a diagram of a typical coupling capacitor voltage transformer.

FIG. 1 shows a typical coupling capacitor voltage transformer (CCVT) which is useful in stepping down transmission line voltage for use by substation protection, control and monitoring equipment, such as a protective relay. The CCVT steps down the voltage level of the signal on the power transmission line to a level useful by such devices. The CCVT of FIG. 1, referred to generally at 10, includes coupling capacitors 12 and 14. The individual coupling capacitors 12 and 14 may each comprise a number of individual capacitors, but in any case, form a voltage divider between the transmission line voltage and ground.

The voltage divider formed by capacitors 12 and 14 typically provide an initial step-down function to a voltage in the 5–15 kv range. A compensating reactor element, i.e. inductor 16, which typically has an iron core, is connected from a point between capacitors 12 and 14 and the primary of a conventional step-down transformer 18, which also typically includes an iron core. Compensating reactor 1 in effect cancels the reactance of the coupling capacitors 12 and 14 at the functional frequency of the power system, and prevents a phase shift between the primary and secondary voltages at that frequency. Typically, the voltage at the secondary of the step-down transformer 18 is at a level which is appropriate for the follow-on protective relay, i.e. 115 volts phase-phase, or 66.4 volts phase-ground.

Compensating reactor 16 and step-down transformer 18, however, introduce a number of specific losses, including copper and core losses. The combination of capacitors and inductors also introduces the possibility of a ferroresonance effect. To compensate for the possible ferroresonance effect, a ferroresonance suppression circuit 20 is connected across the secondary of the transformer 18. The ferroresonance suppression circuit 20, which is discussed in more detail below, is necessary to avoid over-voltages caused by ferroresonance, but has the possible negative effect on CCVT performance of aggravating the transient response, depending upon the particular suppression circuit used.

As briefly discussed above, while the CCVT has its advantages, it also produces a transient following changes, particularly significant changes, to the input voltage, the transient being produced when a fault occurs on the transmission line and the power line voltages quickly change from a nominal level to a relatively low level. Instead of following precisely the change in line voltage, the output of the CCVT includes a temporary transient, somewhat like a DC offset, which remains for a certain amount of time following the change in input line voltage. The transient occurs because coupling capacitors 12 and 14 and the compensating reactor 16 are energy storage elements which cannot instantaneously change their charge or flux.

Figure 2:
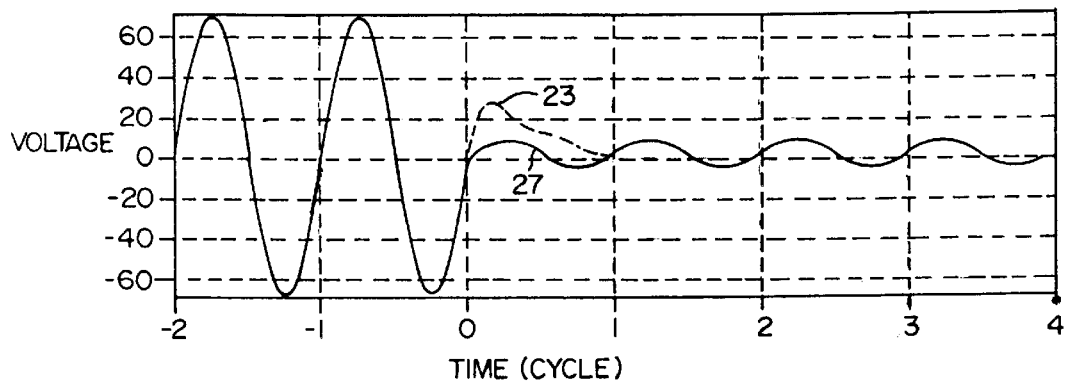
FIG. 2 shows a comparison between the transient response and the ratioed input voltage of a CCVT for a fault at a power system voltage zero crossing.
Figure 3:
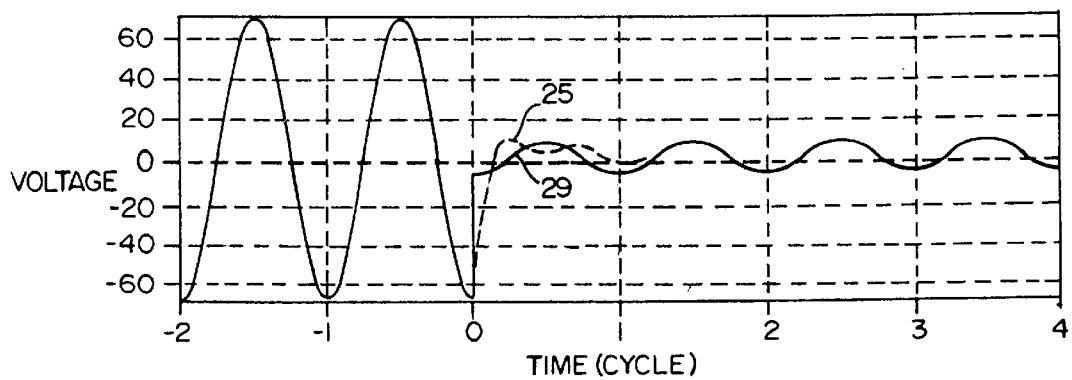
FIG. 3 shows a comparison between the transient response and the ratioed input voltage of a CCVT for a fault at a power system voltage peak point.

The actual shape of the CCVT transient depends to some extent on the precise point of the voltage waveform when the fault occurs. FIGS. 2 and 3 show the output response of a CCVT, including the transient, for a fault which occurs at a voltage zero crossing and at a voltage peak, respectively, of the input signal. Note that the transient 23 for the voltage zero crossing fault is significantly worse than the transient 25 for the fault which occurs at a voltage peak. For a fault which occurs at points on the voltage waveform between the zero crossing and the peak, the transient response will be somewhere between the two responses shown in FIGS. 2 and 3. The true output voltage is shown at 27 and 29 in the respective figures.

The fundamental component of the CCVT transient response determines the overreach of the zone 1 distance element in the relay, i.e. a fault occurring beyond the portion of the line protected by the zone 1 elements where a zone 1 distance element operates undesirably. Obviously, the larger the overreach, the poorer and less secure the performance of the relay. Hence, it is desirable to minimize the magnitude of the transient and make the CCVT output conform as much as possible to the true, non-transient output. However, the protective relay cannot control the transient and must make allowance for the transient and minimize the overreach which might occur due to the transient.

Each of the elements of the CCVT shown in FIG. 1 will have some effect on the transient response of the CCVT. For instance, the total capacitance of capacitors 12 and 14 affects the transient response. Generally, the larger the capacitance the better the transient response, both in terms of decreasing magnitude and duration thereof. A larger capacitance will in addition affect the fundamental component of the transient response. A larger capacitance will also result in a higher value of reactance required for capacitive compensation, such that there is a higher compensating reactor loss. Increased capacitance, however, means a higher total cost for the apparatus.

There is also a difference in the transient, depending on whether the ferroresonance suppression circuit 20 is an active circuit or a passive circuit. FIG. 4a shows an example of an active circuit. The circuit includes a parallel LC circuit comprising a capacitor 22 and an inductor 24. A loading resistor 26 is connected between a midpoint of inductor 24 and one side of the secondary of the transformer portion of the CCVT. The LC circuit is selected so that it will resonate at the frequency of the power system signal and present a high impedance to the power signal voltage at this frequency. Loading resistor 26 will attenuate those voltages having a frequency other than the fundamental power system frequency.

A passive suppression circuit is shown in FIG. 4b, which includes a permanent loading resistor 30 and a parallel, saturable inductor 32 connected from the midpoint of the secondary of the transformer portion to one side thereof. An air gap loading resistor 34 is connected across the secondary. Under normal operating conditions, the secondary voltage is not high enough to flash the air gap or saturate the inductor. The loading resistor 30 thus will have no effect on the performance of the transformer. However, once a ferroresonance oscillation begins, the additional voltage appearing at the secondary will result in a flashing of the gap connected to resistor 34, which results in an attenuation of the oscillation by resistor 34. Inductor 32 saturates at approximately 50% above the nominal secondary voltage value, which helps prevent a sustained ferroresonance oscillation condition.

FIG. 5 shows the CCVT transients for active 35 and passive 37 suppression circuits, respectively, against the true output voltage 39. The passive suppression circuit clearly results in a significantly better CCVT transient response for the same fault. The active storage elements of the active ferroresonance circuit act like a band pass filter and introduce additional time delay in the CCVT secondary and hence aggravate the CCVT transient. The passive resonant circuit typically has little negative impact on the transient response, since most of its elements are isolated form the CCVT output when ferroresonance is not present.

The load or burden connected to the CCVT secondary, such as a protective relay, also has an effect on the CCVT transient characteristic. While the transient response does increase in both magnitude and duration with respect to an increase in the resistive load, such as increase does not result in a corresponding increase in the overreach characteristic of the relay. Hence, a resistive load per se does not appear to be significant relative to the overreach problem generally associated with the transient characteristics of a CCVT.

As indicated above, in the past a number of solutions or compensations have been attempted to accommodate the CCVT transient response and its corresponding effect on zone 1 elements having an overreaching response. In some cases, the solution has been to reduce the zone 1 distance. This has generally proven to be not very effective in those cases where the overreach is large, as this causes the zone 1 distance to decrease to an insignificant distance.

Another solution involves delaying the action of the zone 1 distance elements. If the delay exceeds the duration of the transient response, then the transient response will be basically accommodated, without any direct adverse consequences. However, this solution sacrifices the advantage of the reaction speed of fast solid-state and microprocessor-based relays.

In the present invention, a time delay is used with the presence of a transient response being identified by a number of different comparison functions, using threshold voltages and currents which are automatically calculated, in combination with a supervisory determination which allows a trip signal to proceed within the duration of the time delay if certain selected conditions are met indicating a fault within the zone 1 reach, as opposed to a fault outside the zone 1 reach which appears to be within zone 1 due to the CCVT transient.

Figure 6:
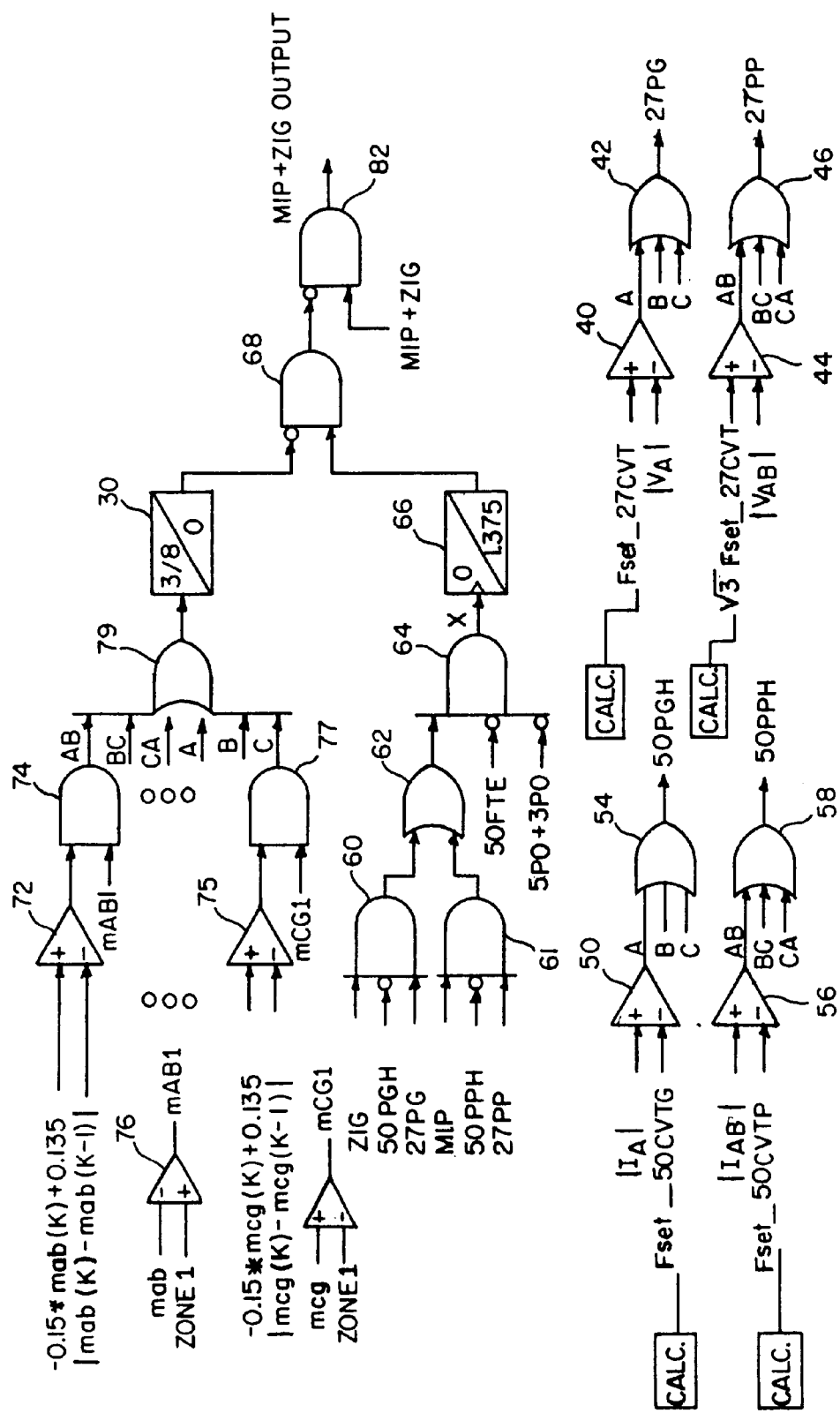
FIG. 6 is a diagram of the transient detection circuit of the present invention.

The circuit for accomplishing these results is shown in FIG. 6. One of the basic purposes of the circuit of FIG. 6 is to recognize CCVT transient conditions and prevent a distance element overreach due to the transient. Only a minimal time delay (significantly less than the transient time delay), however, is permitted for actual zone 1 faults. For ease and reliability of use, the circuit of FIG. 6 is adapted so that the user does not have to make any special settings in order for the circuit to be operative.

The circuit of FIG. 6 is, however, disabled by a lack of a logic enable setting under the following circumstances. First, the circuit is not enabled when the particular relay application does not involve the use of CCVTs, i.e. the circuit of FIG. 6 is used only in those relay applications where there are CCVTs and hence transient responses. Second, the circuit is not enabled when the CCVT uses a passive ferroresonance suppression circuit. As pointed out above, such a passive suppression circuit results in a transient response which does not produce the overreaching characteristics of other CCVT circuits. Third, the circuit is not enabled when the source-to-line impedance ration (SIR) in a particular application will always be less than five.

The operation of the circuit of FIG. 6 is established on the assumption that the SIR value can be five or greater. It should be understood that another SIR value could be selected. The circuit of FIG. 6 operates over a wide range of SIR values without any significant loss in performance. This feature is important in the automatic calculation of threshold values, without the user having to provide input settings.

In FIG. 6, a low voltage condition of the power system is detected. When the power system voltage is low and all the poles (breakers) are closed, the relay input voltage may include a CCVT transient. A low voltage threshold value is established and each phase-to-ground voltage (A, B and C phase) and phase-to-phase voltage (AB, BC and CA) is compared with the threshold. If any of those voltages is less than the specified threshold, then a conventional phase-to-ground undervoltage element or a phase-to-phase undervoltage element associated with the particular low voltage circuit is asserted, i.e. that particular element produces a high output.

FIG. 6 shows a comparator 40 for phase-to-ground voltage for phase A. Comparator 40 compares the absolute value of the A phase voltage with a low voltage threshold, referred to as an $F_{set}$-27CVT. The numeral "27" is standard industry nomenclature for an undervoltage element. The CVT portion of the designation is arbitrary and may be changed.

The value of the low voltage threshold in the present invention is determined on the basis of a radial transmission line having a source-to-line impedance ratio (SIR) of five. The threshold is in effect the anticipated relay voltage when a short circuit fault occurs at the end of the radial line (a fault which is beyond the zone 1 reach). The threshold voltage value can be calculated by multiplying a threshold value of current, which is discussed below, by the value of the replica line impedances, which are known for a particular transmission line. An alternative way of calculating the voltage threshold for a phase-ground undervoltage element is to ratio the nominal voltage (66.4V) with the source impedance and the line impedance. Where the SIR is five, the resulting threshold is 11.1 volts. The significant aspect of the threshold calculation is that it is accomplished automatically and requires no user-determined settings.

As indicated above, the threshold value is compared with the actual value of the A phase voltage, and if the A phase voltage is less than the threshold, a high output is provided to OR gate 42. Other inputs to OR gate 42 are the outputs of similar comparators using similar threshold voltage values for B phase and C phase voltages. The output of OR gate 42, referred to as 27PG, is applied to a conventional phase-to-ground undervoltage element in the protective relay (not shown) and is an input to AND gate 60. A high output from OR gate 42 will cause the undervoltage element to assert. As indicated above, the numeral "27" is standard industry nomenclature for a relay undervoltage element. "PG" is an arbitrary designation used herein for a phase-to-ground undervoltage element. The assert outputs of the zone 1 distance elements are referred to as an M1P signal (phase distance) and Z1G signal (ground distance), respectively.

The determination of a low voltage condition for a phase-to-phase voltage (AB, BC and CA) is similar. A comparator 44 for the VAB voltage value is shown. Similar comparators are used for VBC and VCA values. The threshold value identified above with respect to the phase-to-ground low voltage comparison in 40 is multiplied by √3 and then used as the threshold for comparator 44. The absolute value of the phase A to phase B (AB) voltage is compared against this threshold value. If the $V_{AB}$ value is less than the threshold, then there is a high output to OR gate 46, which also receives inputs from the BC and CA voltage comparators. If any of those three inputs are high, then the output (27PP) of OR gate 46 is also high, which is applied to a low voltage phase-to-phase element and is also used as an input to AND gate 61. The 27PP designation from OR gate 46 identifies a phase-to-phase undervoltage condition.

A low voltage condition alone, however, indicated by either of the undervoltage elements asserting, is not sufficient to reliably indicate a CCVT transient condition and thereby delay zone 1 tripping, because a low voltage condition is also evidence of an actual fault, for example, a close-in fault. In order to reliably indicate a transient condition, a low voltage determination is combined with or supervised by overcurrent elements. FIG. 6 shows the comparison of phase-to-ground current $I_A$ and phase A to phase B current $I_{AB}$ with a threshold. As with the low voltage comparisons, a comparison is also made between the respective threshold and each of the phase-to-ground currents and the phase-to-phase currents in addition to the A phase and AB phase-to-phase currents shown.

In FIG. 6, the phase-to-ground current for A phase ($I_A$) is compared against a threshold designated as $F_{set}$-50CVTG. The numeral "50" is an industry designation referring to an overcurrent condition or element. The other portions of the designation are arbitrary and could be changed. The comparison for $I_A$ is carried out in comparator 50.

The threshold current for comparator 50 is determined according to the following formula:

$$I_A = I_1 + I_2 + I_0 = 3V_{nom}/6(2Z_{L1} + Z_{L0}) = V_{nom}/2 \cdot (2Z_{L1} + Z_{L0})$$

where $I_1$ is positive sequence current, $I_2$ is negative sequence current and $I_0$ is zero sequence current, where $V_{nom}$ = nominal voltage or approximately $66.4V_{LN}$, where $Z_{L1}$ is the positive sequence replica line impedance and $Z_{L0}$ is the zero sequence replica line impedance. These impedances are user-entered values which are used to characterize the line for use by distance elements and in fault location functions. These impedances are known by the user and are the only values entered. If $I_A$ is larger than the threshold, then the output of comparator 50 is a one or high, which is applied as an input to OR gate 54, along with inputs from the comparators for $I_B$ and $I_C$. If any of the inputs to OR gate 54 are high, the output of OR gate 54 is high, which causes an overcurrent element 50PGH to assert. Again, the designation "50" is an industry nomenclature for an instantaneous overcurrent element, while applicant has used the term "PGH" to refer to a phase-to-ground overcurrent element.

The phase-to-phase comparison, using comparator 56, uses a threshold value 50CVTP calculated as follows for $I_{AB}$:

$$I_{AB} = |A^2 - A| \cdot |I_1 I_2 = \sqrt{3} \cdot (2 I_1)| = \sqrt{3} V_{nom}/Z_{L1} \cdot 6$$

If $I_{AB}$ is larger than the threshold, then the output of comparator 56 is high, which is applied to an OR gate 58. The other inputs to OR gate 58 are from similar comparators for $I_{BC}$ and $I_{CA}$ values. The threshold values for those comparators are the same as indicated above for the $I_{AB}$ comparison. The output (50PPH) of OR gate 58 is applied to AND gate 61.

Referring still to FIG. 6, the 50PGH signal and the 27PG signal are applied, as indicated above, to an AND gate 60, with the 50PGH signal being applied to a NOT input of AND gate 60. In addition, the output Z1G from the zone 1 phase-to-ground distance element is also applied to AND gate 60. The output of AND gate 60 is normally low, and goes high only when there is a coincidence of a low voltage indication (the 27PG signal), a NOT high current indication (absence of a 50PGH signal) and an assert from the zone 1 phase-to-ground distance element (the Z1G signal).

As indicated above, the presence of the zone 1 ground distance element assert signal means the relay is about to trip the circuit breaker unless that signal is delayed or extinguished. When the above conditions are satisfied, however, the output of AND gate 60 is high, which is applied to an OR gate 62, the output of which is applied to an AND gate 64, which includes NOT inputs for designated SOFTE and SPO+3PO signals.

The SOFTE (switch onto fault enable) signal is high for a short time following re-closing of a previously tripped breaker. Otherwise, it is low. Hence, unless there has been a very recent re-closing of a breaker, this input at AND gate 64 will be high. The other input (SPO+3PO) to AND gate 64 is high when there is either a single pole open (SPO) signal, i.e. one phase breaker is open, or all three poles are open a 3PO signal). If all of the poles are closed, then the corresponding NOT input is also high, and when there is a Z1G signal, a signal is applied to a timer 66. Timer 66 is initiated upon transition of its input signal from 0 to one, and has a zero pickup time. Timer 66 runs for 1.375 cycles, which is typically sufficient to cover the duration of the CCVT transient. The output of timer 66 is applied to an AND gate 68, to which is also applied at a NOT input a signal referred to as an m calculation smoothness signal. The term "m calculation" refers to a fault impedance determination from a formula provided below. The "smoothness" determination refers to the stabilization time required for the calculated fault impedance value to return to a normal value after a fault has occurred. The rate of return or smoothness distinguishes a close-in fault from a CCVT transient. The smoothness determination is carried out by a series of comparators; comparator 72 is exemplary for an m calculation for phase ASB.

Comparator 72 compares the quantity 0.15 *mab(k)+ 0.135 with the absolute value of mab(k)–mab(k–1), where mab is the m calculation (the minimum reach of a distance element required to just detect the fault presented to the relay) for phase AB, k is the most recent determination of such a value, and k–1 is the value immediately previous to the most recent (k) value. The calculation of an mab is carried out eight times per power signal cycle. Other processing intervals may of course be used within the spirit of the present invention. The m calculation is a fault impedance determination, according to the formula:

$$m = \frac{\mathrm{Re}(V \cdot V_P^*)}{\mathrm{Re}(ZIV_P^*)}$$

where V equals the measured voltage on the transmission line, $V_P^*$ is the complex conjugate value of the polarizing voltage, Z is the replica line impedance, and I is the measured current of the power system. The polarizing voltage is a reference voltage used within the relay for fault direction and other fault determinations.

The m value expression at the + input to comparator 72 is compared with the difference between the most recently calculated m value and the next most recent m value. If the m value expression at the + input to comparator 72 exceeds the m value at the – input, an output from comparator 72 is applied to AND gate 74. The other input to AND gate 74 is what is referred to in FIG. 6 as an mAB1 signal. MAB1 is the result of a comparison by comparator 76 between the mab value and a threshold value for a zone 1 AB phase distance element. If the mab value is less than the threshold, then the output of comparator 76 is high and this is applied to AND gate 74. An mab value less than the zone 1 threshold means that the relay detects a fault within the reach of the zone 1 phase distance element.

The output of AND gate 74 is applied as one input to an OR gate 78. The other inputs to OR gate 78 are results of similar comparisons for m calculation smoothness for a fault impedance of phase B to phase C, and phase C to phase A. A similar comparator 74 and AND gate 77 combination is shown for a phase C to ground determination with the mCG1 signal resulting from a comparison of the mcg impedance values against a selected threshold. Similar comparator and AND gate combinations are used for phase A to ground and phase B to ground. These outputs are also applied as inputs to OR gate 78.

The output of OR gate 78 is applied to a timer 80. If any of the above-described m calculation comparisons result in a high output from, for instance, AND gate 74 or other comparable AND gate, it indicates that the fault impedance value has stabilized or normalized at a rate which is indicative of a close-in fault as opposed to a CCVT transient.

When the output of OR gate 78 goes high, the output of timer 80 will be delayed for ⅜ths of a cycle from going high; it will stay high as long as the output of OR gate 78 thereafter remains high.

A high output of timer 80 is applied to AND gate 68 to disable or override the blocking signal output from timer 66. If the m calculation smoothness factor does not indicate a prompt return to normalcy, then the output from timer 80 will continue low and the output from AND gate 68 will be high. This output is applied to a NOT input of AND gate 82. The other input to AND gate 82 is a zone 1 phase or ground assertion from a zone 1 distance element. If there is a zone 1 distance element assertion, which would otherwise result in a trip signal, and the conditions have been satisfied indicating a CCVT transient, such that timer 66 is running for 1.375 cycles and if the m calculation smoothness is not sufficient to override the timer 66 output by the timer 80 output, then the output of AND gate 82 remains low and there is no trip signal, resulting in a delay in the zone 1 trip signal for the 1.375 cycles of timer 66.

However, if there is an output from timer 80, indicating that the override or supervisory function of the circuits leading into timer 80 have been satisfied, then after ⅜ths of a cycle, and a continuing signal from zone 1 distance elements, then there will be a high output from AND gate 82, resulting in an override of the 1.375 cycle delay to allow a faster tripping signal (prior to the full 1.375 cycles). Hence, there is protection in the event of an actual fault against the delay in tripping produced by the CCVT transient detection circuit.

Hence, the present invention provides a controlled trip signal which takes into account the CCVT transient, but also provides fast tripping in the event of a recognized true fault, which is accomplished by m calculations. In addition, the circuit is quite user-friendly, since it requires basically no settings by the user when they are using CCVTs in applications where the SIR value can exceed five. Only the line impedance values need to be set, and these settings are required in any event for distance protection. The thresholds for all determinations are then automatically calculated.

Figure 8:
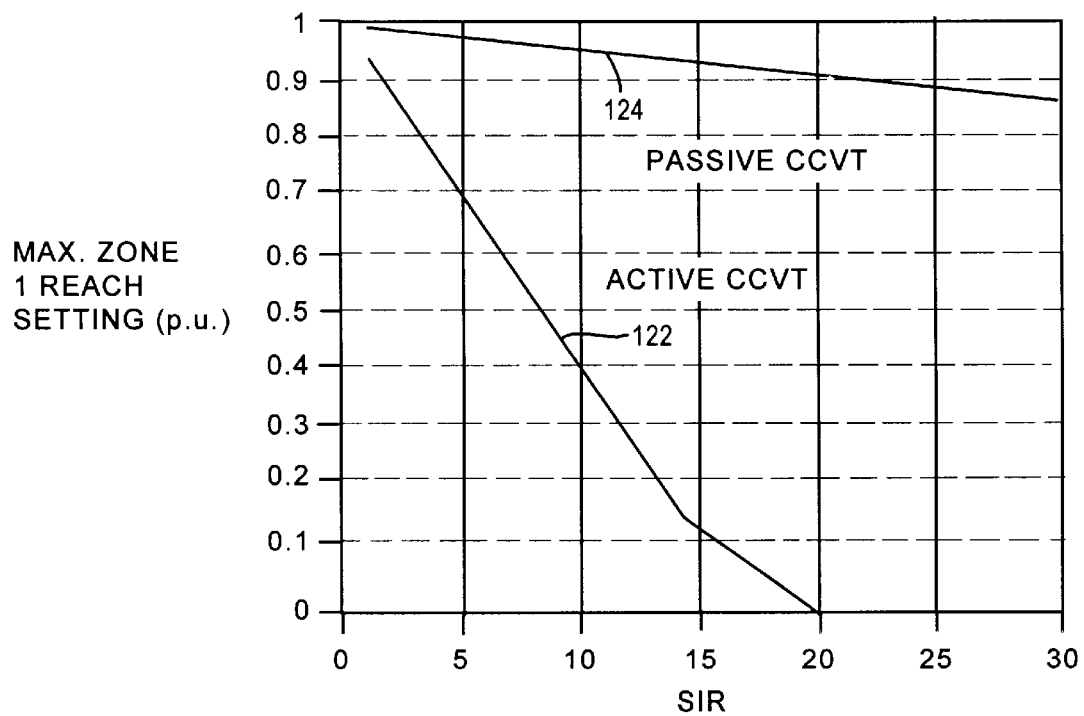
FIG. 8 is a chart which correlates SIR values with reduction in reach for a zone 1 distance element for the embodiment of FIG. 7.
Figure 9:
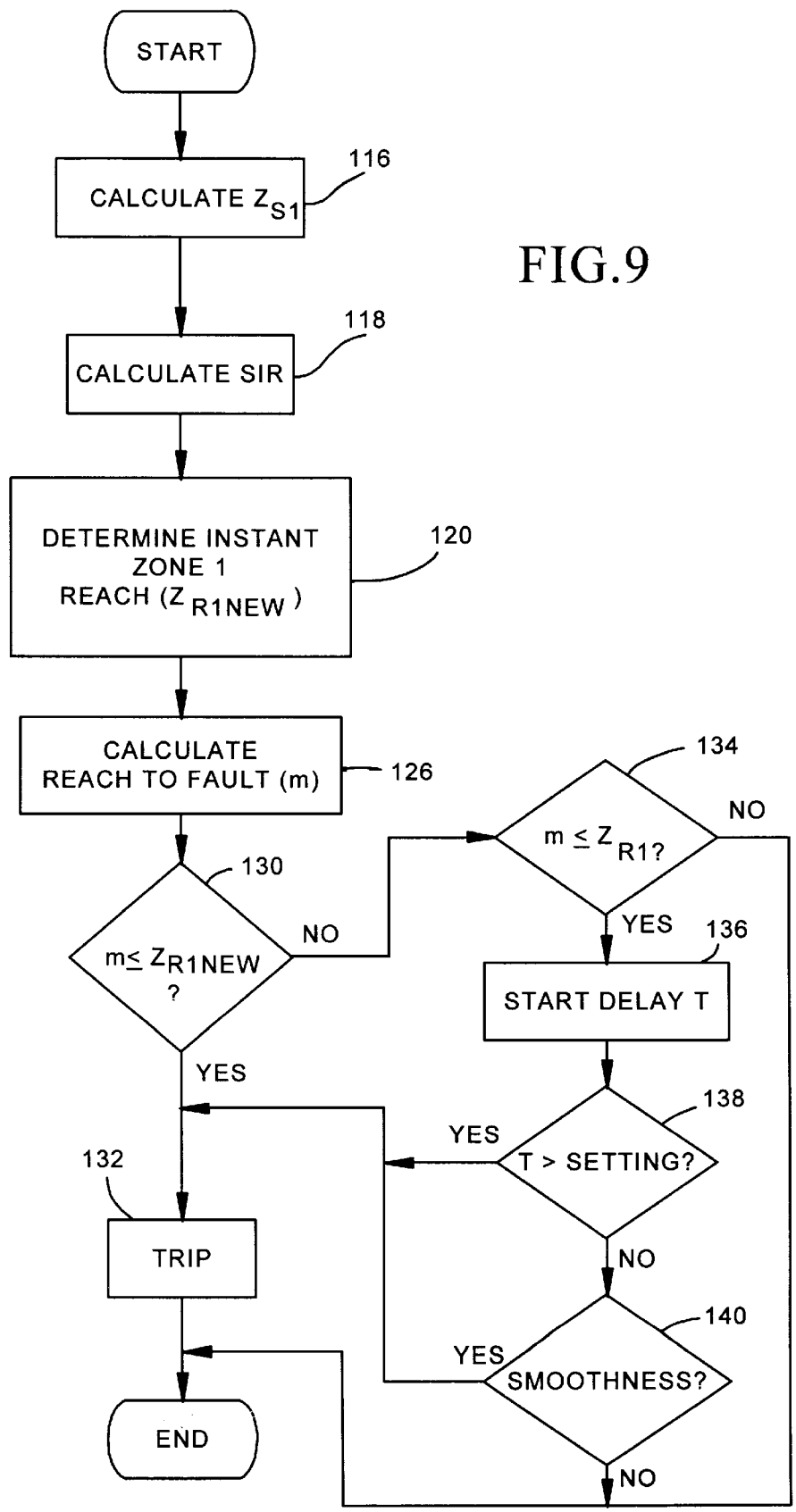
FIG. 9 is a flow chart showing the operation of the system of the embodiment of FIG. 7.

The above-described embodiment does provide advantages over previous systems which attempt to compensate for the CCVT transient output of the secondary of the CCVT by adding a delay time which extends past the transient period. However, that embodiment is subject to tripping delays when an actual fault occurs well within the zone 1 reach of the system. For those faults which are relatively close to the protective relay and within zone 1 (close-in faults), however, there should be no deliberate time delays in tripping. The system of FIGS. 7–9 eliminates the deliberate time delay of FIGS. 1–6 for faults which are within a close-in region of zone 1.

This system (FIGS. 7–9) automatically splits the zone 1 reach of the protection system into two parts, referred to, respectively, as an instantaneous portion and a time-delayed portion. The extent or "reach" of the zone 1 instantaneous portion is determined by first calculating the value of SIR (system impedance ratio) for the original zone 1, and then using that SIR value with a chart which plots SIR values relative to a reduction in zone 1 reach.

For any faults which are determined to be within this instantaneous zone (i.e. close-in faults), tripping occurs immediately, without delay, because overreaching is not a problem for such faults, while for those faults which are within the difference between the maximum instantaneous zone 1 reach and the original zone 1 reach, both a time-delay and an m-smoothness (from the previous embodiment) determination are used to determine when a trip signal from the zone 1 element should be produced. Hence, the present invention has the advantage of preventing zone 1 element overreaching due to the CCVT transient, as was accomplished by the system discussed above; and has the further advantage of producing an undelayed trip signal for close-in faults for which there are no overreach concerns, i.e. those faults within an "instantaneous" portion of the zone 1 reach. This improves the security of the protective system.

Figure 7:
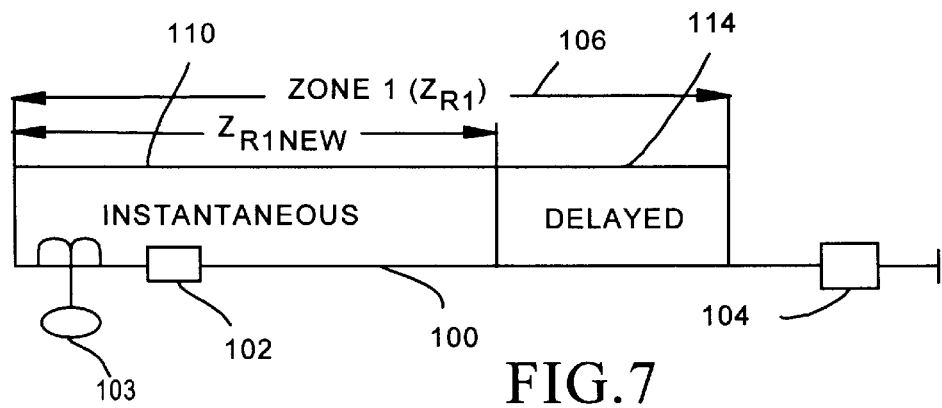
FIG. 7 is a diagram showing a zone 1 reach divided into two portions for a different embodiment.

FIG. 7 shows a simple representation of a power line 100 with two breakers 102 and 104 at opposite ends of the line. FIG. 7 also shows a zone 1 reach 106 which extends from the relay location 103 to a point slightly in front of breaker 104, or the end of the line (typically 85% of the line impedance). As discussed above, CCVT transformers will typically produce an overreach of zone 1 by the zone 1 elements, which is undesirable. The embodiment of FIGS. 1–6 teach a specific arrangement to compensate for or overcome such overreach. In that embodiment, a fixed SIR above 5 is assumed. In the present embodiment, referring to FIG. 7, the zone 1 reach 106 is divided into two portions, an instantaneous portion 110 which extends from the origin or start of the normal zone 1 reach (or the relay location) to a point some distance before the end of the normal zone 1 reach. In this area, overreaching is not a problem. The remaining portion of zone 1, from the end of the instantaneous portion 110 to the end of the normal zone 1 reach, is shown in FIG. 7 as the time delayed portion 114 of the zone 1 reach.

The reach of the instantaneous zone 1 portion 106 will vary according to the SIR (the system impedance ratio) of the system. The system impedance ratio is calculated automatically using the zone 1 reach impedance $Z_{R1}$ and the source impedance $Z_{S1}$, both of which are known or can be readily calculated. In the embodiment shown, referring to FIG. 9, the positive sequence source impedance ($Z_{S1}$) is first calculated at step 116. The calculation of the positive sequence source impedance is conventional and is thus not discussed in detail here. Secondly, in step 118, the SIR is calculated using the formula $SIR = Z_{S1}/Z_{R1}$, where $Z_{R1}$ is the reach impedance of the original zone 1.

In the next step, shown at 120, the reduced reach, i.e. the instantaneous portion 110 of original zone 1, is determined. This is accomplished by use of an automatic calculation within the apparatus based on the information in the chart in FIG. 8. This chart compares calculated SIR values, as discussed above, against fractional reach values (fractions of the zone 1 reach) for both active CCVT and passive CCVT arrangements, i.e. for both applications. These plots are shown as lines 122 (active CCVTs) and line 124 (passive CCVTs) in FIG. 8. For a particular SIR value, the appropriate plot line will provide the reduction in zone 1 reach. For instance, for an active CCVT with a SIR of 10, the fractional reach would be 0.4. Hence, the instantaneous portion of the original zone 1 will be 0.4 of that original zone 1. The fraction provided by the chart is then multiplied by the original $Z_{R1}$ value to provide an actual impedance for the reduced zone 1, i.e. the instantaneous portion 110. This is referred to hereinafter as a reduced reach value.

When a fault occurs on line 100, the minimum reach necessary to just detect the fault is calculated, as shown at step 126. This is done in order to determine whether the fault is within the instantaneous portion 110. This reach calculation, referred to as m reach herein, is discussed in U.S. Pat. No. 5,325,061, titled "Computationally Efficient Distance Relay for Power Transmission Lines", owned by the assignee of the present invention, and incorporated by reference herein. The m calculation is also discussed relative to the previous embodiment above. This is a convenient determination of the approximate distance to the fault. Other calculations could be used as well. The m reach value, represented as an impedance, is then compared against the impedance for the instantaneous portion (reduced reach) of zone 1. If the m reach value is less than/equal to the reduced reach value, then the circuit breaker for the system is tripped, as shown at step 132. Thus, in effect, for faults within the instantaneous portion of zone 1, i.e. close-in faults, a trip occurs substantially immediately, i.e. there are no deliberate delays in the protective system.

If, however, the minimum reach value is greater than the reduced reach, i.e. the fault is not within the instantaneous portion of zone 1, then a further comparison is made at step 134 against the full reach of zone 1. If the minimum reach is greater than the original zone 1 (greater than $Z_{R1}$), then the processing cycle comes to a conclusion. This means that the fault is beyond the original zone 1 reach and relay 103 should not operate. If, however, the minimum (M) reach value is less than/equal to the zone 1 reach (but greater than the reduced reach value), this means that the fault is within the time-delayed portion of FIG. 7.

A timer is then initiated, accumulating a time T. The timer T begins with a fixed value (T=0) and then accumulates an additional amount of time each time a processing cycle occurs. The accumulated time T is then compared against a setting in step 138. An example of a setting is 1.5 cycles of the power system signal. If the time T is greater than the setting, where the setting is established so as to be greater than the time of the transients of the CCVT (see FIG. 5), then a trip signal is produced. If the accumulated time T is less than the setting value, a smoothness comparison is made at step 140. Such a smoothness determination is discussed above with respect to the embodiment of FIGS. 1–6. If the smoothness criteria is not satisfied, then the processing cycle ends. If the smoothness meets the established criteria, indicating that the transients have died down, then a trip signal is also produced.

Hence, in this embodiment, an SIR value is calculated and is used in conjunction with the determination of an instantaneous reach portion and a delayed-time reach portion of zone 1. If the fault is determined to actually be within the instantaneous portion, then a trip is accomplished immediately. As with the first embodiment, an advantage of this embodiment is that all the steps are carried out automatically.

Although a preferred embodiment of the invention has been disclosed herein for illustration, it should be understood that various changes, modifications and substitutions may be incorporated in such embodiment without departing from the spirit of the invention, which is defined by the claims as follows:

What is claimed is:

1. A system for increasing security in a power system using a protective relay having a zone I distance element with a set reach, the relay responsive to a secondary signal from a secondary of a coupling capacitor voltage transformer, the secondary signal having a transient, wherein the system comprises:

means for determining a system impedance ratio (SIR) value for the original zone 1 reach of the protective relay;

means for determining a reduction in the zone 1 reach, using said SIR value;

means, in response to a fault which occurs on a power line portion of the power system, for determining whether the fault is within the reduced zone 1 reach;

means for providing a trip signal without a deliberate delay if the fault is determined to be within the reduced zone 1 reach; and means for delaying a trip signal by a selected amount of time if the fault is determined to be beyond the reduced zone 1 reach, but within the original zone 1 reach.

2. A system of claim 1, wherein the selected time is approximately 1.5 cycles of the power signal on the power line.

3. A system of claim 2, including means for determining a minimum reach necessary to just detect the fault and means for comparing the minimum reach with the reduced reach value.

4. A system of claim 1, wherein the reduced reach is sufficient to include a close-in fault.

5. A system of claim 1, wherein the trip signal delay is overridden if a selected smoothness standard is satisfied for the secondary signal from the voltage transformer.

* * * * *